(12) United States Patent
Hoefgen-Allmann

(10) Patent No.: US 10,166,942 B2
(45) Date of Patent: Jan. 1, 2019

(54) MOTOR VEHICLE SEAT ARRANGEMENT OCCUPANCY DETECTION

(71) Applicant: GM GLOBAL TECHNOLOGY OPERATIONS LLC, Detroit, MI (US)

(72) Inventor: Michael Hoefgen-Allmann, Ruesselsheim (DE)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 42 days.

(21) Appl. No.: 15/378,309

(22) Filed: Dec. 14, 2016

(65) Prior Publication Data

US 2017/0166152 A1    Jun. 15, 2017

(30) Foreign Application Priority Data

Dec. 14, 2015  (DE) .................. 10 2015 016 205

(51) Int. Cl.
| | | |
|---|---|---|
| *G01L 1/20* | (2006.01) | |
| *B60R 21/015* | (2006.01) | |
| *B60N 2/00* | (2006.01) | |
| *B60N 2/68* | (2006.01) | |
| *G01L 1/22* | (2006.01) | |

(52) U.S. Cl.
CPC ........ *B60R 21/01516* (2014.10); *B60N 2/002* (2013.01); *B60N 2/686* (2013.01); *G01L 1/205* (2013.01); *G01L 1/2206* (2013.01)

(58) Field of Classification Search
CPC .. G01G 19/4142; G01G 23/005; G01L 1/125; G01L 1/127; G01L 1/2206; G01L 1/26; Y10S 73/02; B60R 21/01516; B60R 21/01526; B60R 21/0152; B60N 2/002; B60N 2/7094; A61G 5/1091
See application file for complete search history.

(56) References Cited

U.S. PATENT DOCUMENTS

| | | | | |
|---|---|---|---|---|
| 5,570,903 A | * | 11/1996 | Meister .................. | B60N 2/002 180/273 |
| 5,942,695 A | * | 8/1999 | Verma .................... | B60N 2/002 177/144 |
| 7,055,365 B2 | | 6/2006 | Yanagi | |

(Continued)

FOREIGN PATENT DOCUMENTS

| | | |
|---|---|---|
| DE | 102004027009 A1 | 12/2005 |
| DE | 102008007158 A1 | 7/2008 |

(Continued)

OTHER PUBLICATIONS

German Patent Office, German Search Report for German Application No. 102015016205.5, dated Sep. 16, 2016.

*Primary Examiner* — Harshad R Patel
*Assistant Examiner* — Brandi N Hopkins
(74) *Attorney, Agent, or Firm* — Lorenz & Kopf, LLP

(57) ABSTRACT

The present invention relates to a measurement arrangement for detecting an occupancy of a motor vehicle seat arrangement with at least one seat, which comprises a sensor arrangement with at least one sensor (10) for detecting a deformation of a lower side (21) facing away from the seating surface or of a force loading by a lower side (21) facing away from the seating surface of a seat cushion (20) of at least one seat of the motor vehicle seat arrangement, which is fastened on a structural element (40) of the motor vehicle.

16 Claims, 1 Drawing Sheet

(56) References Cited

U.S. PATENT DOCUMENTS

| | | | |
|---|---|---|---|
| 7,096,745 B2* | 8/2006 | Kobata | G01G 19/4142 |
| | | | 73/862.041 |
| 7,172,244 B2 | 2/2007 | Ali et al. | |
| 8,328,276 B2* | 12/2012 | Inayoshi | B60N 2/002 |
| | | | 280/735 |
| 2002/0070539 A1 | 6/2002 | Yasui | |
| 2004/0187609 A1 | 9/2004 | Nishio et al. | |
| 2006/0236785 A1 | 10/2006 | Gloutsos et al. | |
| 2015/0123436 A1* | 5/2015 | Boyer | B60N 2/646 |
| | | | 297/217.2 |
| 2015/0143927 A1* | 5/2015 | Goedert | B60N 2/7094 |
| | | | 73/862.641 |
| 2015/0283923 A1 | 10/2015 | Kordel et al. | |

FOREIGN PATENT DOCUMENTS

| | | |
|---|---|---|
| JP | H09207638 A | 8/1997 |
| JP | 2003291707 A | 10/2003 |
| WO | 2005070731 A1 | 8/2005 |

\* cited by examiner

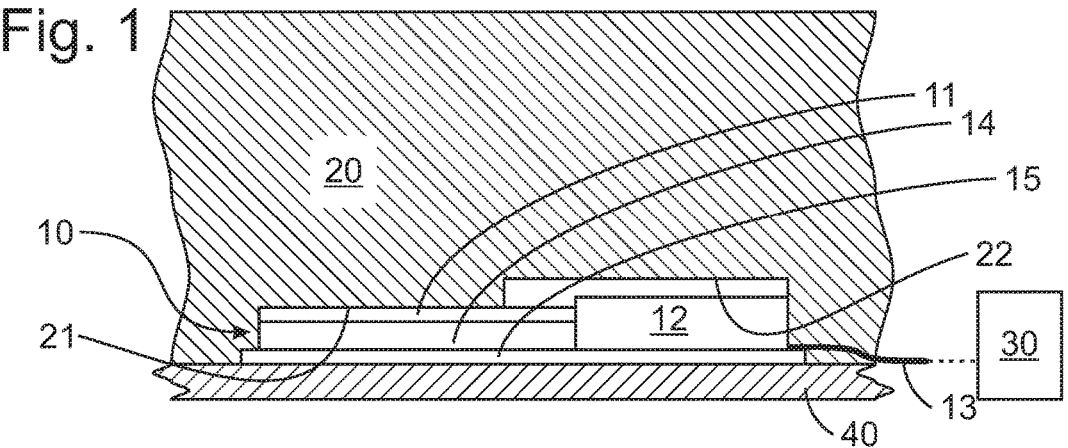
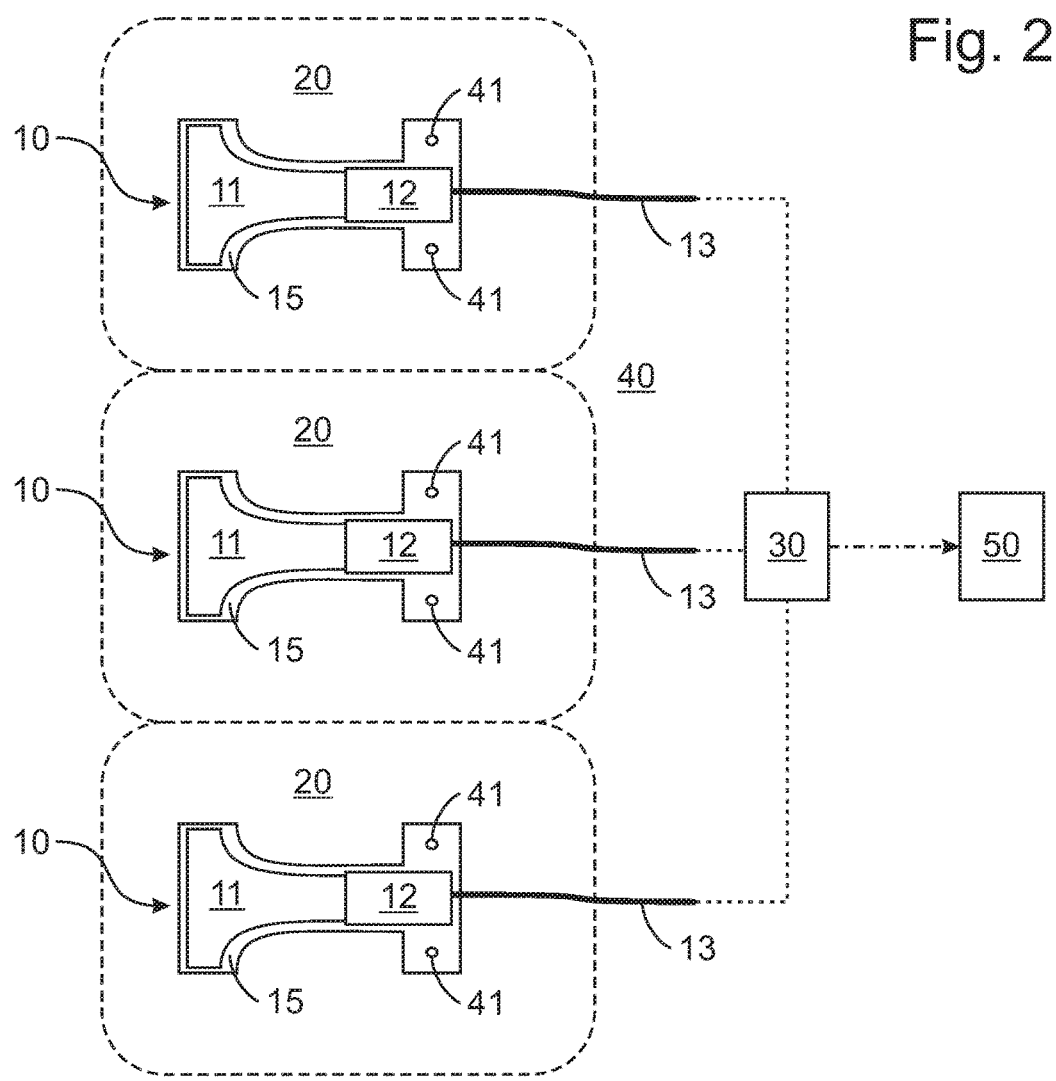

MOTOR VEHICLE SEAT ARRANGEMENT OCCUPANCY DETECTION

CROSS REFERENCE TO RELATED APPLICATION

This application claims priority to German Patent Application No. 102015016205.5 filed Dec. 14, 2015, which is incorporated herein by reference in its entirety.

TECHNICAL FIELD

The present invention relates to a measurement arrangement and to a method for detecting an occupancy of a seat arrangement of a motor vehicle and to a motor vehicle with the measurement arrangement and a method for mounting the measurement arrangement.

BACKGROUND

Based on a detection of an occupancy of a seat arrangement of a motor vehicle, a wearing of a seat belt reminder for a vehicle seat detected as (occupant) occupied ("seat belt reminder") and/or corresponding airbags can be triggered if required only for vehicle seats detected as (occupant) occupied.

From DE 10 2008 007 158 A1 a back seat of a vehicle with a pressure sensor is known, which is integrated in a seating surface of the back seat.

SUMMARY

The present invention improves the detection of a seat occupancy in a motor vehicle.

According to an embodiment of the present invention, a seat arrangement for a motor vehicle, in particular a passenger car, in particular of a motor vehicle, in particular of a passenger motor car called motor vehicle seat arrangement in brief, comprises one or more (motor vehicle) seats, in particular passenger seats, in particular back seats.

A measurement arrangement for detecting an occupancy of the motor vehicle seat arrangement, in particular an occupant occupancy or occupancy by occupants of the motor vehicle, comprises, according to an embodiment of the present invention, a sensor arrangement with one or more sensors for the electrical and/or automated detection of a deformation of a bottom side facing away from the seating surface, in particular surface of a seat cushion of one or more seats of the motor vehicle seat arrangement, as a consequence of an occupant occupancy, or for the in particular electrical and/or automated detection of a force loading, in particular pressure loading of the sensor arrangement by a lower side facing away from the seating surface, in particular surface of a seat cushion of one or more seats of the motor vehicle seat arrangement, as a consequence of an occupant occupancy.

By detecting a deformation of a lower side facing away from the seating surface or force loading by a lower side of a seat cushion facing away from the seating surface, an influence of a seat cushion cover in particular compared with a sensor arranged between seating surface side cover and seat cushion (molded body) or integrated in the seat cushion (molded body) and thus a calibration effort and/or measurement error can be reduced in an embodiment.

Additionally or alternatively, an assembly, a housing and/or a signal transmission, in particular a cabling, can be improved and/or the seat arrangement protected in an embodiment by detecting the deformation of the lower side facing away from the seating surface or force loading by the lower side facing away from the seating surface.

Additionally or alternatively, a greater deformation compared with a sensor arranged on a stiff support of the seat can be utilized and thus a measurement accuracy and/or a measurement range increased in an embodiment by detecting the deformation of the lower side facing away from the seating surface or force loading by the lower side facing away from the seating surface.

In an embodiment, one or more sensors for detecting a deformation of a lower side facing away from the seating surface or a force loading, in particular pressure loading by a lower side of a seat cushion facing away from the seating surface of one or more seats of the motor vehicle seat arrangement can be arranged in case. In particular, the sensor arrangement in an embodiment can thus comprise a (first) sensor for detecting a deformation of a lower side facing away from the seating surface and/or force loading by a lower side facing away from the seating surface of a seat cushion of a (first) seat of the motor vehicle seat arrangement. In a further development at least one further sensor for detecting the deformation of the lower side facing away from the seating surface and/or force loading by the lower side of the seat cushion facing away from the seating surface of this (first) seat and/or in each case one or more further sensors for detecting a deformation of a lower side facing away from the seating surface and/or force loading by a lower side of a seat cushion facing away from the seating surface of one or more further seats of the motor vehicle seat arrangement.

According to an embodiment of the present invention, the sensor arrangement or its sensor(s) will be or is fastened directly to a structural element of the motor vehicle.

Because of this, the fastening and/or detection measurement accuracy and/or signal transmission, in particular cabling, and/or assembly can be improved in an embodiment and/or the sensor arrangement protected.

In an embodiment, the motor vehicle seat arrangement is arranged in vehicle longitudinal direction behind one or more further seats of the motor vehicle and/or comprises in vehicle transverse direction two or more seats arranged next to one another, the occupancy of which is detectable or detected through the measurement arrangement, in particular individually or by a specific seat or by specific cushion.

Because of this, an occupancy of back seats of the motor vehicle can also be detected in an embodiment and in a further development, based on this detection, a wearing of a seat belt reminder for a vehicle seat detected as (occupant) occupied and/or one or more corresponding airbags, in particular side airbags and/or roof airbags, if required, can be triggered only for or in the case of vehicle seat(s) detected as (occupant) occupied.

When the motor vehicle seat arrangement comprises two or more seats arranged next to one another, the seat cushions of which are assigned to at least one sensor of the sensor arrangement in each case or the lower side deformation or force loading of which is detectable or detected by at least one sensor of the sensor arrangement each, an individual occupancy of a seat bench can be detected in an embodiment.

In an embodiment, the motor vehicle seat arrangement can be a back seat arrangement with one or more (rearmost) back seats of the motor vehicle.

In contrast with front and/or middle seats, back seats are frequently fastened to the body of the motor vehicle without adjusting mechanism in vehicle longitudinal direction. For this reason, fastening of a sensor arrangement for detecting a deformation of its lower sides facing away from the seating surface or force loading by its lower side facing away from the seating surface to a structural element of the motor vehicle can be particularly advantageous.

In an embodiment, the structural element is an integral element of a body of the motor vehicle, in particular an element or component of the so-called BIW body ("body in white").

Because of this, the fastening and/or detection, in particular measurement accuracy and/or signal transmission, in particular cabling and/or sensor arrangement can be protected in an embodiment.

In an embodiment, the structural element, to which or on which the sensor arrangement is fastened, is designed plate-like. In a further development, the structural element extends at least substantially in vehicle transverse and longitudinal direction and/or comprises one or more seat (cushion) troughs, on which in an embodiment one or more sensors of the sensor arrangement are or will be arranged entirely or partly.

Additionally or alternatively, a stiffness of the structural element in vehicle vertical direction amounts to two times, in particular at least four times a seat cushion stiffness of the motor vehicle seat arrangement in vehicle vertical direction.

Because of this, the fastening and/or detection, in particular measurement accuracy, and/or signal transmission, in particular cabling, and/or assembly can be improved and/or the sensor arrangement protected in an embodiment.

In an embodiment, the structural element can be a back seat plate or back seat platform of a BIW body of the motor vehicle.

In an embodiment, the lower side facing away from the seating surface of at least one seat cushion of the motor vehicle seat arrangement contacts the sensor arrangement or one or more sensors of the sensor arrangement at least in a deformed state occupied with a test weight and/or in an unloaded state of the seat cushion. In an embodiment, the test weight amounts to at least 30 kg and/or to a maximum of 60 kg per seat (cushion). In particular, a lower side can contact a sensor even in an unloaded state or only with a minimum loading.

Because of this, the fastening and/or detection, in particular measurement accuracy, and/or signal transmission, in particular cabling, and/or assembly can be improved and/or the sensor arrangement protected in an embodiment.

In an embodiment, the lower side facing away from the seating surface or surface of one or more seat cushions of the motor vehicle seat arrangement (each) comprises a recess for the complete or partial receiving of one or more sensors of the sensor arrangement for detecting a deformation of the lower side facing away from the seating surface or force loading by the lower side of this seat cushion facing away from the seating surface. The recess accordingly can be part of the lower side or surface of the seat cushion and the sensor arrangement in an embodiment detects a deformation of a bottom and/or a wall of the recess or force loading by a bottom and/or a wall of the recess or is intended or equipped to do so. Accordingly, at least temporarily one or more sensors of the sensor arrangement in each case are or will be arranged or received completely or partly in recesses of the lower sides of the motor vehicle seat arrangement facing away from the seating surface designed for this purpose.

Because of this, the sensor arrangement can be protected and/or stowed in a more compact manner in an embodiment.

In an embodiment, one or more sensors of the sensor arrangement (in each case) comprise an in particular foil-like measurement layer for the electrical detection of an elastic deformation of the lower side of the associated seat cushion of the motor vehicle seat arrangement and/or of the measurement layer, in particular by the lower side contacting them or for the electrical detection of a force loading, in particular pressure loading of the measurement layer by the lower side of the associated seat cushion of the motor vehicle seat arrangement contacting it. In particular, the measurement layer can detect a deformation or force loading-induced change of an electrical resistance, of an electrical capacity and/or of an electrical inductance and/or a deformation or force loading-induced current or voltage change, in particular generation or be designed or equipped for this purpose, for example by means of foil-like strain gauges, piezo elements or the like.

Because of this, the fastening and/or detection, in particular measurement accuracy and/or signal transmission, in particular cabling and/or assembly can be improved and/or the sensor arrangement protected in an embodiment.

In an embodiment, the measurement layer is connected (in each case) via an interface which is connected to it permanently or destructively detachably, in particular bonded or welded, to or on a cabling for passing on signals of the measurement layer to a detection means of the measurement arrangement, in particular non-destructively detachably or permanently or destructively detachably.

In an embodiment, an elastic support layer is arranged on or to the side of the measurement layer facing away from the seat cushion of one or more sensors of the sensor arrangement (in each case). In a further development, the support layer can comprise an elastomer, in particular consist thereof. In an embodiment, the elastic support layer is an elastically deformable support layer and/or has a minimum, maximum and/or mean thickness or wall thickness of at least 0.5 mm, in particular at least 1 mm, at least 1.5 mm and/or maximally 20 mm, in particular maximally 15 mm, in particular maximally 10 mm and/or a modulus of elasticity of at least 0.1 MPa and/or maximally 200 MPa.

By way of the elastic support layer, an occupancy-induced deformation of the sensor arrangement and thus its measurement accuracy and/or measurement range can be increased in an embodiment and/or the sensor arrangement protected. In an embodiment, the support layer is non-destructively detachably or permanently or destructively detachably connected to the measurement layer, in particular bonded or welded to the same.

In an embodiment, a carrier is arranged on the side of the elastic support layer facing away from the measurement layer of one or more sensors of the sensor arrangement (in each case). In a further development, the carrier can comprise a plastic, in particular polypropylene (PP), in particular consist thereof. In an embodiment, the carrier has an in particular minimum, maximum and/or mean thickness or wall thickness of at least 0.5 mm, in particular at least 1 mm, in particular at least 1.5 mm, and/or maximally 20 mm, in particular maximally 15 mm, in particular maximally 10 mm, and/or a modulus of elasticity which is at least two times, in particular at least four times that of the modulus of elasticity of the elastic support layer of the (respective) sensor. In an embodiment, the carrier is fastened to or on the structural element (in each case).

By way of the carrier, the fastening and/or assembly can be improved in an embodiment and/or the sensor arrangement protected. In an embodiment, the carrier is connected to or on the support layer in a non-destructively detachable or permanent or destructively detachable manner, in particular bonded or welded to the same.

In an embodiment, one or more sensors of the sensor arrangement, in particular its measurement layer, support layer or carrier, are fastened to or on the structure element in a non-destructively detachable or destructively detachable or permanent manner.

By way of a non-destructively detachable fastening, the assembly, in an embodiment, retrofit or only optional original equipment with the measurement arrangement, and/or disassembly of the measurement arrangement can be improved. By way of a permanent or destructively detachable fastening, the fastening and/or detection, in particular measurement accuracy, can be improved in an embodiment.

In an embodiment, one or more sensors of the sensor arrangement, in particular its measurement layer, support layer or carrier, are fastened to or on the structural element in a form-fit, frictionally engaged and/or materially bonded manner, by means of one or more screw, rivet, bonding, welding, clamping and/or plug connections.

Because of this, in particular the fastening and/or detection, in particular measurement accuracy, and/or assembly can be improved in an embodiment.

In an embodiment, one or more sensors, in particular its measurement layer, support layer or carrier, are initially detachably fastened to or on the structural element, in particular by means of one or more screw, clamping and/or plug connections, and subsequently these sensors, in particular their measurement layer, support layer or carrier, fastened in a non-destructively detachable manner to or on the structural element, by means of one or more riveting, bonding and/or welding connections. Because of this, the assembly can be improved in an embodiment.

In an embodiment, one or more seat cushions of the motor vehicle seat arrangement are supported, in particular fastened to or on the structural element, in particular (in each case) a trough of the structural element, jointly or individually, rigidly or articulatedly, non-destructively detachably or permanently or destructively detachably and/or in a form-fit, frictionally engaged and/or firmly bonded manner.

In the case of seat cushions which are fastened in an articulated and/or detachably fastened manner, the fastening of the measurement arrangement on the structural side in an embodiment can also make possible an occupancy of the (load) surface with seat cushions removed, in particular folded away. In the case of rigidly fastened seat cushions, the fastening of the measurement arrangement on the structure side can protect the sensor arrangement in an embodiment.

For detecting an occupancy of the motor vehicle seat arrangement by means of the measurement arrangement described here, the same detects, in particular a detection means of the measurement arrangement, in an embodiment, in particular electrically and/or automatedly and/or by means of the sensor arrangement, a deformation of a lower side facing away from the seating surface and/or a force loading by a lower side facing away from the seating surface of a seat cushion of one or more seats of the seat arrangement.

In a further development, a processing means of the measurement arrangement reminds of the wearing of a seat belt based on this detection in the case that an occupancy, in particular occupant occupancy, of the corresponding seat cushion and a seat belt for this seat cushion which is not buckled up is detected, or the measurement arrangement comprises a processing means for reminding of the wearing of a seat belt based on the detection by the detection means in the case that an occupancy, in particular occupant occupancy of the corresponding seat cushion and a seat belt which is not buckled up is detected for this seat cushion.

A means in terms of the present invention can be designed as hardware and/or software, in particular comprise a processing unit in particular microprocessor unit (CPU) that is preferentially data or signal connected to a storage and/or bus system, in particular digital and/or one or more programs or program modules. The CPU can be designed to execute commands which are implemented as a program stored in a storage system, to detect input signals from a data bus and/or output signals to a data bus. A storage system can comprise one or more, in particular different storage media, in particular optical, magnetic, solid-state and/or other non-volatile media. The program can be of such a type that it embodies the method described here or is capable of carrying out the same, so that the CPU can execute the steps of such methods and thereby in particular detect an occupancy of the motor vehicle seat arrangement.

In an embodiment, a seat cushion can comprise a molded body from a foam material and/or a cover, in particular from textile, plastic and/or leather, in particular consist thereof.

BRIEF DESCRIPTION OF THE DRAWINGS

The present invention will hereinafter be described in conjunction with the following drawing figures, wherein like numerals denote like elements.

FIG. 1 shows a measurement arrangement for detecting an occupancy of a motor vehicle seat arrangement according to an embodiment of the present invention in a section; and FIG. 2 shows a top view of the measurement arrangement.

DETAILED DESCRIPTION

FIG. 1 shows in a section perpendicularly to a vehicle transverse direction a measurement arrangement for detecting an occupancy of a motor vehicle seat arrangement according to an embodiment of the present invention.

The motor vehicle seat arrangement comprises multiple back seats with seat cushions 20 arranged in vehicle transverse direction (perpendicularly on the drawing plane of FIG. 1, vertically in FIG. 2) next to one another.

FIG. 2 shows a top view of the measurement arrangement, wherein the seat cushions 20 are hidden in FIG. 2 and merely their outlines are indicated in dashed lines.

The measurement arrangement comprises a sensor arrangement with a sensor 10 each for each back seat for the electric, automated detection of a deformation of a lower side 21 facing away from the seating surface or a force loading of the corresponding sensor 10 by the lower side 21 facing away from the seating surface of the seat cushion 20 of this seat.

Each of the identically constructed sensors 10 comprises a foil-like measurement layer 11 for electrically detecting an elastic deformation or force loading, in particular pressure loading of the measurement layer 11 and of the lower side 21 of the associated seat cushions 20 contacted by the same. The film-like measurement layer 11 can for example measurably change its electrical resistance as a consequence of the elastic deformation or measurably generate electric current or electrical voltage as a consequence of the force loading or pressure loading.

The measurement layer 11 is in each case connected to or on a cabling 13 via an interface 12 permanently connected to it for passing on signals of the measurement layer 11 to a detection means 30 of the measurement arrangement.

On the side facing away from the seat cushion (bottom in FIG. 1) of the measurement layer 11 of each sensor 10 an elastic support layer 14 of elastomer is arranged in each case and bonded to the measurement layer 11.

On the side facing away from the measurement layer (bottom in FIG. 1) of the elastic support layer 14 of each sensor 10, a carrier 15 made of PP each is arranged and bonded to the support layer 14. In a modification, this carrier 15 can also fall away.

For the assembly, the carrier 15 in each case is plugged onto corresponding pins 41 of a structural element in the form of a back seat plate 40 of a BIW body of the motor vehicle and in an embodiment subsequently additionally bonded to the back seat plate 40. In the modification, the support layers 14 can be directly bonded to or on the back seat plate 40.

The back seat plate 40 substantially extends in vehicle transverse direction and vehicle longitudinal direction (vertically, horizontally in FIG. 2) and comprises seat cushion troughs in which in each case one of the sensors 10 is or will be arranged.

The lower sides 21 facing away from the seating surface of the seat cushions 20 each comprise a recess 22 for receiving an associated sensor 10.

For detecting an occupancy of the motor vehicle seat arrangement by means of the measurement arrangement described here, the detection means 30 detects electrically, automatedly and individually a deformation of the lower sides 21 facing away from the seating surface or force loading by the lower sides 21 facing away from the seating surface of the seat cushions 20 of the back seats, as evident in FIG. 2.

A processing means in the form of a display 50 reminds based on this detection of the wearing of a seat belt in the case that an occupant occupancy of the corresponding seat cushion 20 and a seat belt that is not pulled up for this seat cushion 20 is detected.

Although in the preceding description exemplary embodiments were explained it is pointed out that a plurality of modifications is possible. It is pointed out in addition that the exemplary embodiments are merely examples which are not intended to restrict the scope of protection, the applications and the construction in any way. The preceding description rather provides the person skilled in the art with a guideline for implementing at least one exemplary embodiment, wherein various changes, in particular with respect to the function and arrangement of the described components can be carried out without leaving the scope of protection as obtained from the claims and the feature combinations equivalent to these.

The invention claimed is:

1. A motor vehicle seat arrangement comprising:
   at least one seat having a seat cushion with a seating surface and a lower side facing away from the seating surface; and
   a measurement arrangement including
   a carrier fastened to a structural body element of a vehicle body, the carrier being formed by plastic and having a first modulus of elasticity;
   a support layer positioned on the carrier on a carrier side opposite the structural body element and being formed by an elastomer, the support layer having a second modulus of elasticity, the first modulus of elasticity being at least twice the second modulus of elasticity; and
   at least one sensor formed as a foil-like measurement layer on the support layer on a support layer side opposite the carrier and configured to detect a loaded state of the seat cushion by detecting at least one of a deformation or a force loading of the lower side of the seat cushion.

2. The motor vehicle seat arrangement according to claim 1, wherein the motor vehicle seat arrangement in vehicle longitudinal direction is arranged behind at least one further seat of the motor vehicle.

3. The motor vehicle seat arrangement according to claim 1, wherein the motor vehicle seat arrangement in vehicle transverse direction comprises at least two seats arranged next to one another, the occupancy of which is individually detectable by the measurement arrangement.

4. The motor vehicle seat arrangement according to claim 1, wherein the seat cushion comprises a back seat cushion.

5. The motor vehicle seat arrangement according to claim 1, wherein the structural body element comprises a plate-like element having a stiffness in a vehicle vertical direction which is at least two times a stiffness of the seat cushion in the vehicle vertical direction.

6. The motor vehicle seat arrangement according to claim 1, wherein the lower side facing away from the seating surface contacts the at least one sensor when in a deformed state.

7. The motor vehicle seat arrangement of claim 6, wherein the lower side of the seat cushion also contacts the at least one sensor in an unloaded state.

8. The motor vehicle seat arrangement according to claim 1, wherein the lower side facing away from the seating surface comprises a recess for at least partial receiving the at least one sensor.

9. The motor vehicle seat arrangement according to claim 1, wherein the at least one sensor is configured to electrically detect the deformation of the lower side of the seat cushion.

10. The motor vehicle seat arrangement according to claim 1, wherein the at least one sensor is configured to electrically detect the force loading by the lower side facing away from the seating surface.

11. The motor vehicle seat arrangement according to claim 1, wherein the at least one sensor is fastened on the structural body element in a manner selected from the group consisting of a form-fit, frictionally engaged manner, a firmly bonded non-destructively detachable manner or a firmly bonded destructively detachable manner.

12. The motor vehicle seat arrangement according to claim 1, wherein the seat cushion is fastened on the structural element.

13. The motor vehicle seat arrangement according to claim 12, wherein the structural body element comprises a trough and the seat cushion is fastened in the trough of the structural element in a rigid or articulated, non-destructively detachable or destructively detachable manner, and/or form-fit, frictionally engaged and/or firmly bonded manner.

14. The motor vehicle seat arrangement according to claim 13, wherein the seat cushion is fastened in the trough by a manner selected from the group consisting of a rigid, non-destructively detachable manner, an articulated, non-destructively detachable manner, destructively detachable manner, a form-fit, frictionally engaged manner and/or a firmly bonded manner.

15. A motor vehicle, comprising:
   a vehicle body including a structural element that is an integral element of a BIW (body in white) body of the motor vehicle; and
   a motor vehicle seat arrangement comprising at least one seat having a seat cushion with seating surface and a lower side facing away from the seating surface, the seat cushion having an unloaded state when not occupied and a loaded state when occupied by an occupant; and a measurement arrangement including
- a carrier fastened to the structural element, the carrier being formed by plastic;
- a support layer positioned on the carrier and being formed by an elastomer;
- at least one sensor formed as a foil-like measurement layer on the support layer and contacting the lower side of the seat cushion during the unloaded state and the loaded state, the at least one sensor configured to detect the loaded state of the seat cushion by detecting at least one of a deformation or a force loading of the lower side of the seat cushion.

16. The motor vehicle of claim 15, wherein structural element has a first stiffness that is at least four times a second stiffness of the seat cushion in a vehicle vertical direction.

\* \* \* \* \*